Patented July 18, 1933

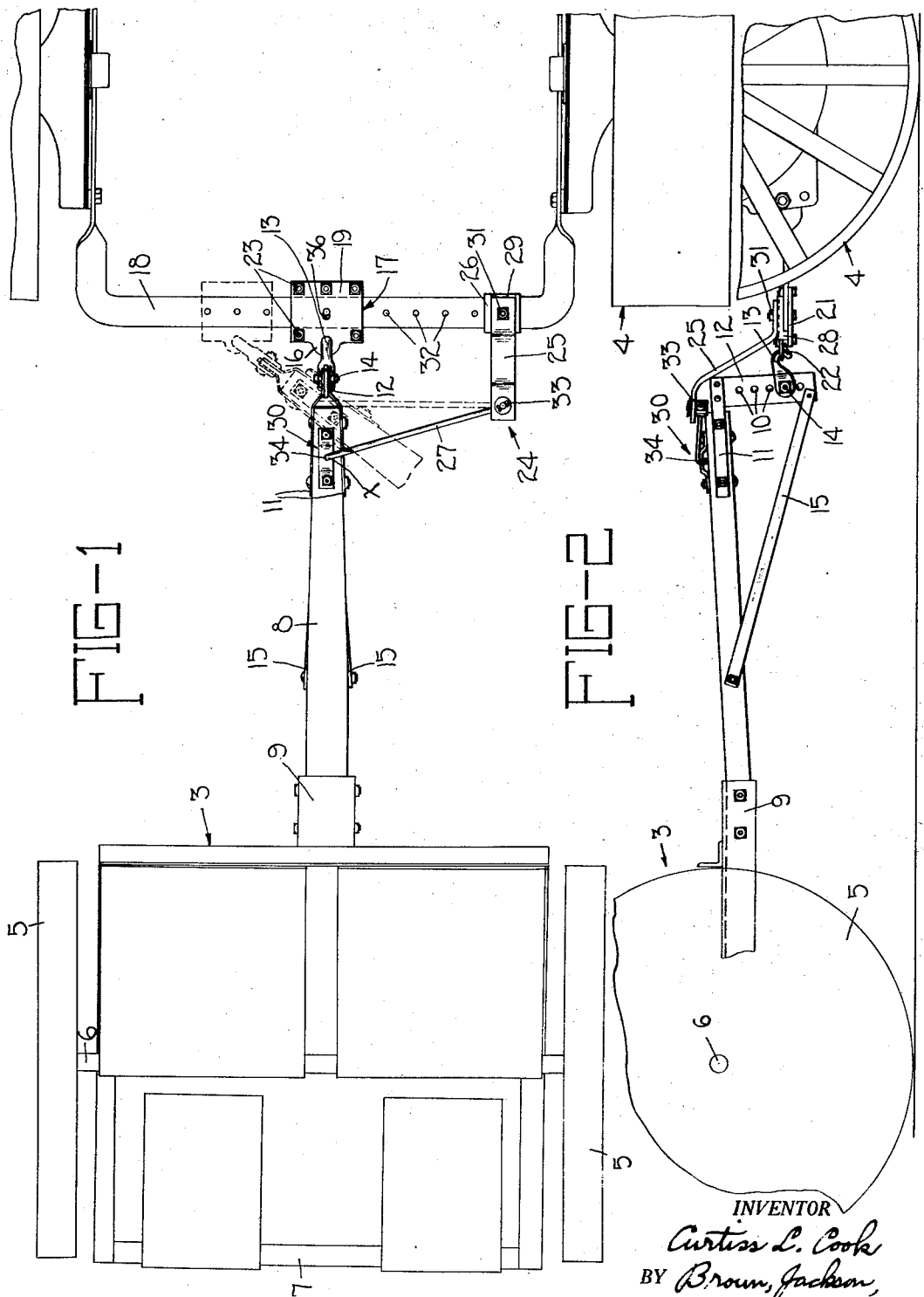

1,918,382

UNITED STATES PATENT OFFICE

CURTISS L. COOK, OF SYRACUSE, NEW YORK, ASSIGNOR, BY MESNE ASSIGNMENTS, TO SYRACUSE CHILLED PLOW COMPANY, INC., OF SYRACUSE, NEW YORK, A CORPORATION OF NEW YORK

HITCH CONNECTION

Application filed January 15, 1931. Serial No. 508,867.

The present invention relates to improvements in hitch connections and more particularly to hitch connections which are adapted for connecting a pulled vehicle, such as a farming implement, to a pulling vehicle, such as a tractor.

Heretofore in working a field by means of a tractor towing an implement, a difficulty which is constantly arising, particularly in fields having short-turning spaces at the ends, is that the implement consistently cuts short at the ends of the rows as the tractor is being turned to draw the implement down the next adjacent rows. It is recognized that the implement could be made to completely finish the rows upon which it is being used by leaving ample turning room at the ends of the field and by making a wide turn with the tractor at the ends of such rows, but this is usually prohibited by the desire to have the plant rows extend up as close to the ends of the field as possible for increasing the area of cultivation. The towing of a row-following implement in back of a tractor presents the problem of so connecting the implement with the tractor that the implement will be maintained on the rows being operated upon and as close up to the ends of such rows as is possible. With the ordinary type of pivotal connection for connecting an implement and a tractor, as soon as the tractor is turned off the rows at the end of the field, the implement is also led off such rows, and since the implement is positioned considerably to the rear of the front end of the tractor, this leading of the implement off the rows occurs long before the implement has reached the ends of the particular rows upon which it is working.

The main object of the present invention resides in the provision of a hitch connection for connecting a towed implement with a tractor in which the pivotal connection between the implement and the tractor is at a relatively forward point, as at the drawbar of the tractor, while the effective pivot point about which the implement moves with respect to the tractor in a horizontal plane, is virtually produced at a relatively rearward point, as to the rear of the drawbar of said tractor.

Another object of the present invention is to delay the leading of the implement off the rows before the implement has come to the ends thereof by positioning the pivot point between the tractor and the implement to the rear of the regular drawbar so that the implement will first be led in the direction opposite to the direction of turn for a proper amount, when the turn is being made at the ends of the rows.

Another object of the invention, in addition to the provision of a hitch device wherein angular movements between the implement and tractor occurring in turning take place about a vertical axis sufficiently to the rear of the tractor to cause the implement to follow the rows being operated on as long as possible, is to include means for having movements between the implement and tractor in a vertical plane, occasioned by the tractor and implement following undulations of the ground surface, occur about a point forward of the first mentioned pivot axis.

A still further object is to provide a hitch connection of the aforementioned type which is constructed from comparatively few and simple parts of durable construction that are easily manufactured and at low cost.

Further objects and advantages will hereinafter appear in the following detailed description of a preferred embodiment of the present invention, such as is illustrated in the accompanying drawing.

In the drawing:

Figure 1 is a general plan view of the hitch connection illustrating the use thereof when applied to the drawbar of a tractor and draft tongue of an implement; and Figure 2 is a side elevational view of the hitch connection and vehicles illustrated in Figure 1.

In the drawing the implement and tractor are diagrammatically illustrated and are generally designated 3 and 4, respectively.

While the implement 3 may be of any type, the particular implement illustrated is of a two wheeled construction having wheels 5 mounted on an axle 6 with the latter supporting the implement structure 7. A draft tongue 8 is rigidly secured at 9 by any suitable means to the implement frame. A pair of straps 11—11 are secured to the sides of the forward end of the draft tongue and project forwardly thereof and support a vertically disposed plate 12. Plate 12 is provided with a plurality of openings 10 whereby the hitch clevis 13 may be connected in different vertical positions by means of a bolt 14. A pair of braces 15—15 are connected between the lower end of plate 12 and the tongue 8 to relieve straps 11 from the total pulling strain, said braces also acting to steady the lower end of plate 12 against lateral swaying.

The hitch clevis 13 is connected with the tractor by inserting the same through a suitable opening in a rearwardly extending lug 16 which may be formed integrally with a shiftable hitch connection 17 that is carried by the tractor drawbar 18. The shiftable hitch connection 17 on the tractor drawbar 18 comprises a pair of plates, the top plate 19 being of the shape shown in Figure 1. The lower plate 21 may be of the same shape as plate 19 and the two plates are spaced apart by means of metal strips or fillers 22 which are of slightly greater thickness than the thickness of the drawbar 18, and suitable bolts 23 extend through suitably aligned openings in plates 19 and 21 and through fillers 22 for securing the aforesaid members together for sliding movement along drawbar 18 laterally or transversely of the tractor. Although the lower plate 21 is not shown as being provided with a rearwardly extending lug, such as 16, such a lug may be provided if desired. The purpose of the shiftable hitch connection on drawbar 18 will be referred to presently.

A draft tongue guiding or controlling means 24 is mounted to one side on the drawbar of the tractor and is provided with means connected with the draft tongue for guiding or controlling the latter. The draft tongue guiding means 24 comprises a suitable bracket such as 25 which is secured to the drawbar of the tractor by means of a clamp 26, and a link 27 which is connected between the draft tongue 8 and the bracket 25. Clamping member 26 is preferably a casting having projecting lugs 28 which extend downwardly therefrom for engaging the opposite edges of the drawbar 18, said member having a groove 29 formed in the face thereof for receiving one end of bracket 25. A bolt 31 is inserted through aligned openings in the end of member 25 and clamp 26, and through any one of the plurality of openings 32 in drawbar 18, for securing bracket 25 in any desired position along said drawbar. Link 27 is connected to the outer end of bracket 25 by means of a universal swivel connection 33 and to the draft tongue 8 by means of any suitable pivotal connection 30 and in such a manner as to allow the bracket end of the link to move vertically as well as horizontally. In the construction illustrated the draft tongue end of link 27 is bent over and inserted into an opening 34 in a yoke 35 mounted on the draft tongue. The link is prevented from moving out of the opening in the yoke by any suitable means, such as a cotter pin.

When a hitch connection of the foregoing construction is utilized for connecting an implement with a tractor, the following operations result. When following a straight course relative angular movements between the implement and tractor in a vertical plane, which are occasioned by the foregoing vehicles following the undulations of the ground surface, occur at the point where the hitch clevis 13 is connected with the sliding hitch 17 of the drawbar. This point of connection of clevis 13 to the drawbar hitch is particularly desirable with implements having only two wheels and a stiff pole or tongue connection. The farther back from the rear axle of a tractor that a tongue of such an implement is connected, the more will the tractor's riding over undulations in the ground surface affect the horizontal positioning of the implement. This is a particularly serious consideration when the ground working tools of the implement are positioned some distance in front or in back of the implement axle. The connection of clevis 13 as hereinbefore described greatly reduces horizontal displacement of the implement.

When making a turn, either to the right or to the left, by reason of the connection between the bracket 25 and the tongue 8 through link 27, which link acts either in compression or in tension, the sliding hitch member 17 of the drawbar is forced to slide to one side or the other of the center line of the tractor. On making a right-hand turn with the tractor, the hitch mechanism will move into a position substantially as shown in dotted lines. As a result of this movement, the implement is initially caused to turn oppositely to the turning direction of the tractor so as to follow the row much longer than it would if the turning movements between implement and tractor were permitted to take place about a stationary hitch point located centrally of the rear end of the tractor, the latter having reference to the ordinary type of draft connection.

With the ordinary type of draft connection the implement is made to turn about a point on the tractor, which point is located where the outer end of the draft tongue is connected with the tractor. With a draft attachment constructed in accordance with the present invention, the implement does not turn about the point where the draft tongue is connected with the tractor, but about some point located rearwardly of the tractor and likewise rearwardly of the point where the draft tongue joins the tractor. In the preferred embodiment of the present invention, as illustrated in the drawings, the draft tongue and the implement are made to turn about a series of points, the locus of these points being the arc described by the draft tongue end of link 27. The initial turning point will be at $x$ and thereafter each successive increment of turn will have a corresponding point located on the locus comprising the arc described by the draft tongue end of link 27. The last point of turn on the arc will be determined by the shortest allowable turn permitted with the present construction of draft attachment. However, all of the successive turning points about which the implement turns are located considerably to the rear of the tractor and to the rear of the point of connection of the draft tongue with the tractor, whereby the implement is first made to turn in a direction opposite to the direction in which the tractor turns. This action is, of course, supplemented by the shiftable hitch member which carries the forward end of the draft tongue laterally along the rear end of the tractor as the tongue is caused to rotate about the end of link 27 as hereinbefore described.

When the tractor is traveling straight ahead the sliding hitch member 17 will automatically position itself on the line of draft, which is substantially along the center line of the tractor, as long as the draft tongue guiding mechanism is secured as in Figure 1. If the sliding hitch member becomes displaced to either side of the line of draft, a lateral force will be created which will cause the sliding hitch member to move toward the line of draft, where the lateral force then becomes nil. It is also to be noted that link 27 and the forward portion of tongue 8 constitute toggle means which is caused to straighten out by the sliding hitch member when the tractor moves in one direction, and which is caused to be broken to a greater extent by said sliding hitch mechanism when the tractor turns in the opposite direction.

The amount of angularity of link 27 with respect to a longitudinal center line passing through the draft tongue and the vehicles when in normal straight forward driving position, may be varied as desired by using links of different lengths under different operating conditions. The length of link used will govern the amount of movement of the sliding hitch member along the tractor drawbar and whatever amount of movement is necessary can be best determined from the particular necessities of the conditions of operation.

Longer links may be readily employed by merely shifting the location of yoke 35 along the length of the draft tongue 8 into whatever position is necessary to accommodate a longer link from that illustrated in Figure 1. Obviously, the use of a longer link will cause the implement to turn about a series of points located still farther to the rear of the point of connection of the draft tongue with the tractor than with the use of a shorter link.

The upper and lower plates 19 and 21, respectively, of the sliding hitch member 17 are also provided with suitably aligned openings 36 for the reception of a bolt or other means adapted to be passed through one of the openings 32 in the tractor drawbar 18. This arrangement is merely for the purpose of anchoring the sliding hitch member 17 to the drawbar 18 to provide a stationary hitch point on the tractor on such occasions where the draft tongue guiding means is not being utilized.

Under certain working conditions, or when utilizing a certain type of implement in a field, it may become desirable to locate the hitch mechanism in such a position on the tractor drawbar as to have the shiftable hitch member 17 normally disposed to one side of the center thereof when said tractor is following a straight course down the field. By so doing the implement would be disposed out of line with the center line of the tractor. This may readily be accomplished by adjusting bracket 25 accordingly along the tractor drawbar by means of clamp 26. It is also possible to connect bracket 25 to the drawbar on the opposite side of the shiftable hitch member, which would bring the guiding means 24 on the opposite side of the draft tongue from the position in which said means is shown in Fig. 1. This will also increase the amount of adjustability of the guiding means, and when the latter is so located the hitch connection will still function in the capacity for which it was devised.

Although a preferred construction of hitch connection has been described and illustrated, it is to be understood that such is only by way of example, and that variations in the construction of the device may readily be made without departing from the metes and bounds of the present invention. The invention is therefore not to be limited to the specific construction shown but only in so far as may be determined by the appended claims.

What I claim is:

1. A hitch connection between a tractor and an implement comprising shiftable hitch means mounted on said tractor for connection with the draft tongue of said implement, and means supported near one side of the tractor for actuating said shiftable means and said tongue laterally relative to the tractor and in a direction opposite to the direction of turn to prevent initial turning of said implement in the turning direction of said tractor.

2. A hitch connection between a tractor and an implement comprising shiftable draft transmitting means slidably mounted on said tractor for lateral movement only and connected with the draft tongue of said implement, and control means connected with said draft transmitting means to move the latter and the draft tongue relative to the tractor in a direction opposite to the direction of turn to prevent initial turning of said implement in the turning direction of said tractor, said control means subsequently causing said implement to turn and follow said tractor.

3. A hitch connection between a tractor and an implement comprising hitch means slidably mounted on the tractor for connection with the implement draft tongue, hook means for connecting said draft tongue with said hitch means for universal movement relative thereto, and automatically operable means connecting said tractor and said draft tongue to prevent initial turning of said tongue and implement in the turning direction of said tractor.

4. A hitch connection between a tractor and an implement draft tongue comprising a draft transmitting member carried by said tractor for connection with said draft tongue, and a draft tongue guiding means fixedly connected with said tractor for guiding said draft tongue, said draft transmitting means being mounted for movement transversely of said tractor, and said guiding means having link means for controlling the movement of said draft transmitting member whereby the latter and said draft tongue are initially moved in a direction opposite to the travel of said tractor when the latter begins to turn.

5. In a hitch connection between a tractor and an implement draft tongue, the combination of shiftable means associated with the drawbar of said tractor, and draft tongue guiding means fixedly secured to said drawbar, said implement draft tongue being pivotally connected with said shiftable means to move therewith, and having horizontal swinging and vertical swinging movements about said pivotal point, and link means connected with said draft tongue rearwardly of the pivotal connection of the draft tongue with said shiftable means and connected with said guide means for causing said draft tongue to swing about a virtual pivot point disposed rearwardly of the point of connection of the tongue with said shiftable means.

6. In a hitch connection between a tractor and an implement draft tongue, the combination of shiftable means associated with the drawbar of said tractor, and draft tongue guiding means fixedly secured to said drawbar, said implement draft tongue being pivotally connected with said shiftable means to move therewith, and having horizontal swinging and vertical swinging movements about said pivotal point, and link means extending between said draft tongue and said guide means for controlling the movement of said shiftable means, said link means being connected with said guide means and said draft tongue respectively for horizontal swinging movement and vertical swinging movement about each of its points of connection.

7. In a hitch connection between a tractor and an implement draft tongue, the combination of a hitch member slidably mounted upon the drawbar of said tractor for bodily movement relative thereto, and draft tongue guiding means adjustably fastened to said drawbar, said implement draft tongue being connected to said hitch member to move therewith, and said guide means being operably connected with said draft tongue to control the lateral movement of said bodily movable hitch member, said guide means being adjustable along said drawbar whereby the draft tongue and hitch member can be disposed in different normal operating positions with respect to said tractor.

8. In a hitch connection between a tractor and an implement draft tongue, the combination of shiftable means associated with the drawbar of said tractor, and draft tongue guiding means secured to said drawbar, said implement draft tongue having vertically adjustable hitch means to connect said draft tongue with said shiftable means, and said guide means being operably connected with said draft tongue to control the movement of said shiftable means for any of the positions of said adjustable hitch means relative to said draft tongue.

9. In a hitch connection between a tractor and an implement, the combination of laterally shiftable means associated with said tractor, and implement guiding means, said implement being pivotally connected with said shiftable means to be drawn thereby, and said implement guiding means comprising a single link extending substantially laterally between said implement and said tractor and having pivotal connection with each respectively.

10. A hitch connection between a tractor and the draft tongue of an implement comprising a transversely disposed drawbar secured to said tractor, a shiftable hitch member mounted on said drawbar for transverse movement therealong, and a link mechanism, said draft tongue having means for connecting it with said shiftable hitch member, and said link mechanism comprising a rearwardly extending bracket supported on said drawbar and a link having universal connection with the draft tongue and said bracket respectively, said link mechanism comprising means whereby said draft tongue is initially actuated in the opposite direction from the direction in which said tractor begins to turn.

11. A hitch connection between a tractor and the draft tongue of an implement comprising a transversely disposed drawbar secured to said tractor, a shiftable hitch member mounted on said drawbar for transverse movement therealong comprising a pair of plates disposed adjacent each face of said drawbar, filler means for spacing said plates disposed oppositely long each edge of said drawbar and between said plates, and means for connecting said plates and said filler means, and a link mechanism, said draft tongue having means for connecting it with one of the plates of said shiftable hitch member, and said link mechanism being operably connected between said tractor and said draft tongue to cause initial movement of said draft tongue in a direction opposite to the direction in which said tractor begins to turn.

12. A hitch connection between a tractor and an implement comprising hitch means carried by said tractor for connection with the draft tongue of said implement, said draft tongue having vertical angular movements about its point of connection with said hitch means, and draft tongue guiding means having one connection with said draft tongue rearwardly of the point of connection of the tongue with said hitch means and having a second connection with the tractor, and said tongue having horizontal swinging movement about the point at which said control means is connected therewith.

13. In a hitch connection between two vehicles, the combination of laterally shiftable means mounted on one of said vehicles for bodily transverse rectilinear movement, said other vehicle being connected with said shiftable means, and vehicle turn controlling means extending directly between said vehicles independently of the aforesaid connection, whereby the initial turning movement of one of said vehicles is responsive to the turning movement of the second of said vehicles and in a direction opposite to the movement of said second vehicle.

14. In a draft attachment for tractors, the combination of a hitch member slidably mounted on said tractor for bodily lateral movement with respect thereto, an implement draft tongue having its one end connected with the implement and its other end pivotally connected directly with said hitch member for horizontal swinging movement and vertical swinging movement about said pivotal connection, and means connected with said tongue for shifting said hitch member in one direction when said tractor begins to turn in the opposite direction.

15. A draft attachment for connecting a pulling vehicle and a pulled vehicle, comprising a draft transmitting member slidably mounted for lateral movement on said pulling vehicle to either side of the center line thereof, and a vehicle guiding means extending independently of said draft transmitting member between said vehicles, said pulled vehicle being directly connected with said draft transmitting member, and said vehicle guiding means initially causing said vehicles to turn relatively oppositely as said pulling vehicle begins to turn in one direction.

16. A hitch connection between a tractor having a transversely extending draw bar and a draft tongue of an implement comprising a hitch member slidably mounted on said draw bar for bodily movement therealong, said draft tongue being connected with said hitch member, and means carried by said tractor and connected with said draft tongue for shifting said hitch member and draft tongue laterally to prevent initial turning of said implement in the turning direction of the tractor when the latter is negotiating a turn.

17. A hitch connection between a pulling vehicle and the draft tongue of a pulled vehicle comprising a hitch member slidably mounted on said pulling vehicle for lateral shifting movement only, said draft tongue being connected with said hitch member, and means for automatically shifting said hitch member and draft tongue laterally with respect to said pulling vehicle to prevent initial turning of said pulled vehicle in the turning direction of said pulling vehicle when the latter is negotiating a turn.

18. A hitch connection between a tractor and an implement draft tongue comprising a transverse draw bar carried by said tractor, said implement tongue having a slidable connection with said draw bar for movement therealong, and means connected between the tractor and tongue to shift said tongue on said draw bar in a direction opposite to the direction in which the tractor turns.

19. A hitch connection between a tractor and an implement draft tongue comprising a transverse draw bar carried by said tractor, said implement draft tongue being connected with said draw bar for movement therealong laterally of the tractor, and means carried by said tractor and connected with the tongue in rear of draw bar to shift said tongue on the draw bar in a direction opposite to the direction in which the tractor turns.

20. A hitch connection between a tractor and an implement draft tongue comprising a transverse draw bar carried by said tractor, said implement draft tongue having one end thereof connected with said draw bar for transverse movement therealong, and means comprising a rigid member on said tractor extending rearwardly of the draw bar and connected with the tongue to shift said tongue transversely of said draw bar in a direction opposite to the direction in which the tractor turns.

CURTISS L. COOK.